No. 761,937. PATENTED JUNE 7, 1904.
G. L. BELDING.
STEAM TRAP.
APPLICATION FILED FEB. 17, 1904.
NO MODEL.
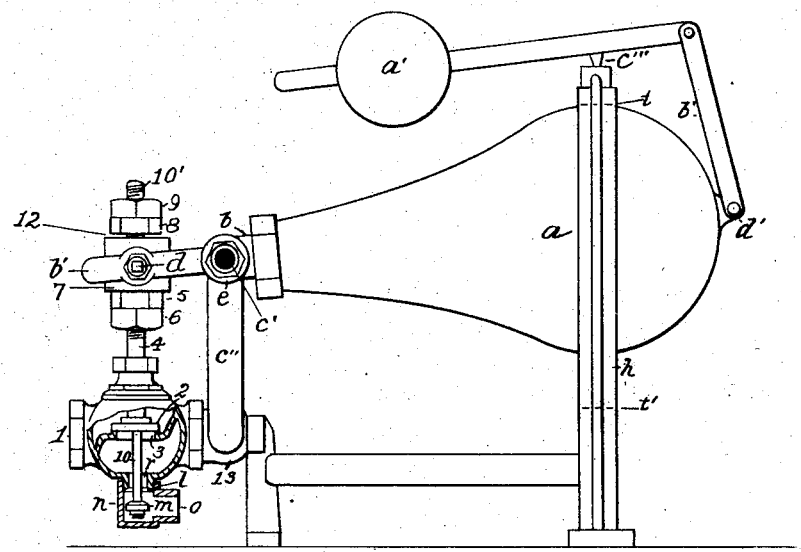
Fig. 1
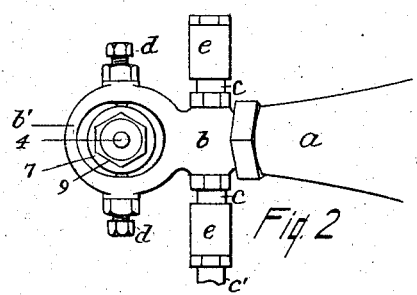
Fig. 2
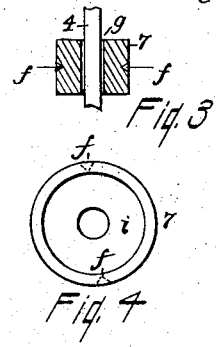
Fig. 3
Fig. 4
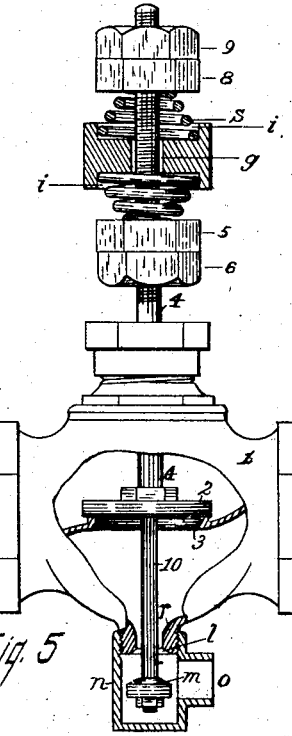
Fig. 5
Witnesses
A. DeF. Anderson
John Mooney
Inventor
Geo. L. Belding
By Attorney No. 761,937.

Patented June 7, 1904.

UNITED STATES PATENT OFFICE.

GEORGE L. BELDING, OF WESTPOINT, NEW YORK.

STEAM-TRAP.

SPECIFICATION forming part of Letters Patent No. 761,937, dated June 7, 1904.

Application filed February 17, 1904. Serial No. 194,031. (No model.)

*To all whom it may concern:*

Be it known that I, GEORGE L. BELDING, a citizen of the United States, and a resident of Westpoint, in the county of Orange and State of New York, have invented certain new and useful Improvements in Steam-Traps, of which the following is a specification.

This invention relates to steam-traps, and particularly to one that is in public use.

The object of the improvement is to increase the durability and the efficiency of the said trap and traps embodying like principles. These objects are attained by the means set forth in this specification and the accompanying drawings.

Reference being made to the drawings, which represent the main features of the trap and my improvements thereto, Figure 1 is a side elevation of the trap as used, showing the valve in cross-section. Fig. 2 is a view of that part of the trap to which this invention relates. Fig. 3 is a detail relating to a sleeve. Fig. 4 is a plan of a recessed sleeve. Fig. 5 is an elevation showing the improvement and the interior of the valve.

The trap comprises chiefly a bowl $a$, Figs. 1 and 2, suspended upon trunnions $c\ c$. The trunnions are tubular and are supported in tubular bearings $e\ e$, the bearings being terminals of the upright tubes $c''$, which are connected with a fitting 13, to which the valve 1 is attached. A counterweight $a'$ is supported on a lever fulcrumed at $c'''$ and connected by a rod $b'$ to the bowl at $d'$. This weight lifts the bowl to the inside top of the frame $h$ when the bowl is empty of water. When the bowl partly fills with water, the weight is overcome and the bowl sinks to the inside bottom $t'$ of the frame $h$. Raising the bowl closes the valve 2 on its seat and opens the valve $m$. Dropping the bowl to its seat $t'$ opens the valve 2 and closes the valve $m$. These movements control the water in this way: It enters the bowl through its trunnions, and the weight of the water causes the bowl to drop. In dropping it lift the valve-stem, opening the upper valve and closing the lower or air valve. Opening the upper valve admits steam from the boiler to the bowl, which causes the water to flow from the bowl by the same way it entered to the boiler. Removing the weight of the water from the bowl causes it to rise and close the upper valve, shutting off steam from the boiler, the lower valve opening and venting the bowl. That part of the bowl connection $b$ which bears the trunnions is called the "trunnion-neck," and it is provided with a ring extension $b'$, adapted to receive within it a sleeve 7. The sleeve is held in place by means of pivot-screws $d\ d$. The screws are pointed and enter countersinks $f\ f$ in opposite sides of the sleeve, as shown in Figs. 2 and 3. This ring is centrally above the valve 1, and the stem 4 of the valve passes through the sleeve 7 loosely, as at $g$, Fig. 3. The valve-stem 4 is provided with a screw-thread $10'$ to admit of two nuts 8 and 9 above and two nuts 5 and 6 below the sleeve, the nuts serving as a means of adjusting the sleeve 7 at a suitable point on the valve-stem.

It is evident that a nice adjustment will be required to enable the bowl to properly open and close the valves it controls, and however nice the adjustment the sudden rising and falling of the bowl will close the valves with more or less of a hammer-blow. The result is that the valve-seats become worn, and the lower valve-stem 10, which is connected to the valve 2 and carries the valve $m$, is not infrequently broken off. To overcome these troubles, a little space, as at 22, Fig. 1, is left for the play of the sleeve; but this does not cure the difficulties, to overcome which is one of the objects of this improvement.

Fig. 5 illustrates my improvement in the manner of adjusting the sleeve 7 in its relation to the valve-stem 4. No change is made in the stem nor in the sleeve-adjusting nuts. As shown in cross-section, the sleeve is recessed on the top and bottom, and springs $s\ s$ are placed on each side of the sleeve between the nuts and the sleeve. By means of the nuts any amount of tension may be put upon the springs to insure the proper action of the valves, yet the sleeve is just as readily adjusted to position as without the springs. These springs give an elasticity to the movement of the valve-stem that relieves the valve of all jar and renders the trap more efficient, with no liability whatever to injury in the manner described. The direct action of the bowl is entirely upon the springs, for when properly adjusted the nuts can neither make contact with the sleeve nor so compress the sleeves as to make them practically solid. With the employment of these springs an increased efficiency of the trap when used under the highest pressures has been particularly observed.

The object in recessing the sleeve 7 is to enable the easy application of this improvement to traps already in use, the recessing being the only change needed in the parts in use. It is done to obtain plenty of room for the springs. It also affords an easy method for holding the springs concentric with the valve-stem; but there are other means of accomplishing this, and it is not intended to limit the application of the springs strictly in the manner shown, as the invention consists of the employment of the springs between the sleeve and the means of adjustment.

Having described my invention, what I claim, and desire to secure by Letters Patent, is—

In a trap substantially as shown, the combination with the sleeve and valve-stem operated by the bowl and the nuts for adjusting the sleeve, springs interposed between the sleeve and the nuts.

Signed at Highland Falls, in the county of Orange and State of New York, this 4th day of February, A. D. 1904.

GEORGE L. BELDING.

Witnesses:
 MOSES F. NELSON,
 J. R. ODENWALDER,
 W. H. BROOKS.